US009091840B1

(12) United States Patent
Vizgaitis

(10) Patent No.: US 9,091,840 B1
(45) Date of Patent: Jul. 28, 2015

(54) DUAL SPECTRAL-BAND OPTICAL LENS IMAGER

(71) Applicant: United States of America, as represented by the Secretary of the Army, Washington, DC (US)

(72) Inventor: Jay N. Vizgaitis, Alexandria, VA (US)

(73) Assignee: UNITED STATES OF AMERICA AS REPRESENTED BY THE SECRETARY OF THE ARMY, Washington, DC (US)

( * ) Notice: Subject to any disclaimer, the term of this patent is extended or adjusted under 35 U.S.C. 154(b) by 0 days.

(21) Appl. No.: 14/190,156

(22) Filed: Feb. 26, 2014

Related U.S. Application Data

(62) Division of application No. 12/975,424, filed on Dec. 22, 2010, now Pat. No. 8,724,216.

(51) Int. Cl.
*G02B 13/14* (2006.01)
*G02B 15/14* (2006.01)
*G02B 9/64* (2006.01)

(52) U.S. Cl.
CPC ............... *G02B 13/146* (2013.01); *G02B 9/64* (2013.01); *G02B 13/14* (2013.01)

(58) Field of Classification Search
CPC ............ G02B 9/00; G02B 9/64; G02B 13/00; G02B 13/0015; G02B 13/0045; G02B 13/0065; G02B 13/008; G02B 13/009; G02B 13/14; G02B 13/143; G02B 13/146; G02B 13/18; G02B 15/00; G02B 15/14
USPC .................................. 359/350–361, 676, 754
See application file for complete search history.

(56) References Cited

U.S. PATENT DOCUMENTS

| 4,471,448 | A | | 9/1984 | Williams |
|---|---|---|---|---|
| 4,486,069 | A | | 12/1984 | Neil et al. |
| 5,796,514 | A | | 8/1998 | Chipper |
| 5,936,771 | A | * | 8/1999 | Cooper .................. 359/618 |
| 6,018,414 | A | | 1/2000 | Chipper |
| 6,091,551 | A | * | 7/2000 | Watanabe .................. 359/676 |
| 6,118,578 | A | | 9/2000 | Hall |
| 6,151,170 | A | | 11/2000 | Chipper |
| 6,424,460 | B1 | | 7/2002 | Kirkham |
| 6,870,690 | B1 | | 3/2005 | Lawson et al. |
| 6,970,286 | B1 | | 11/2005 | Kunick |
| 7,545,562 | B2 | | 6/2009 | Chen et al. |
| 2010/0033578 | A1 | * | 2/2010 | Forestier et al. ............. 348/164 |
| 2011/0315878 | A1 | | 12/2011 | Vizgaitis |
| 2013/0044221 | A1 | * | 2/2013 | Vizgaitis .................. 348/164 |

OTHER PUBLICATIONS

Jay N. Vizgaitis, "Dual Band Infrared Continuous Zoom Lenses," International Optical Design Conference (IODC), Jackson Hole, WY Jun. 13, 2010.
Vizgaitis et al., "3rd Generation FLIR Demonstrator," Proc of SPIE vol. 6940, 6940OU, (2008), pp. 1-10.

* cited by examiner

*Primary Examiner* — Thong Nguyen
(74) *Attorney, Agent, or Firm* — Richard J. Kim

(57) ABSTRACT

A continuous zoom lens arrangement can image MWIR and LWIR spectral bands to a common image plane. Such an exemplary optical system comprises eight infrared imaging lenses that all transmit over the wavelengths 3.5-11.0 microns and form a collocated image plane for the MWIR and LWIR spectral bands. The lens has six stationary lenses, and two lenses that move in an axial fashion. A cold stop inside the dewar can act as the aperture stop of the system and control the stray light from reaching the FPA. The pupil is reimaged from the cold stop to near the first lens of the system to minimize the size of the lens.

4 Claims, 11 Drawing Sheets

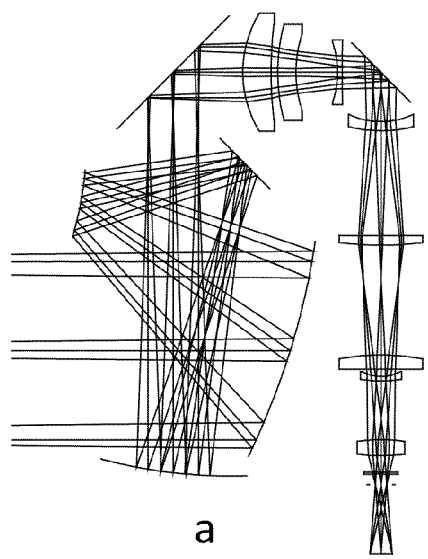
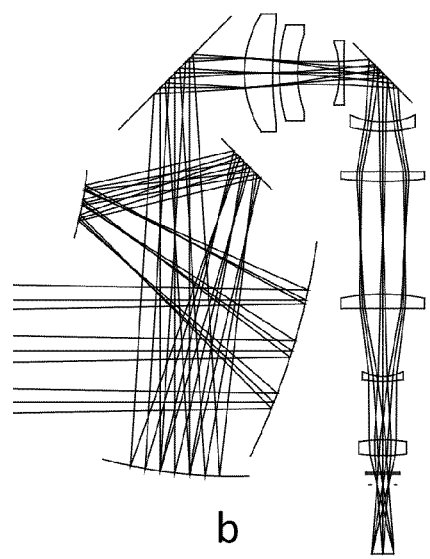
Figure 8a    Figure 8b
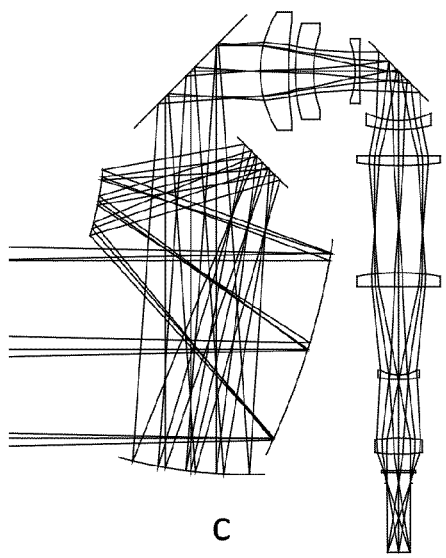
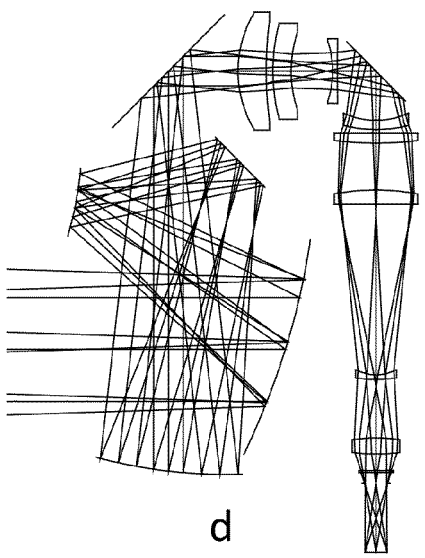
Figure 8c    Figure 8d

| Element Number | Radius of curvature (Front) | Radius of curvature (Back) | Thickness | Material |
|---|---|---|---|---|
| Object | Infinity | | Infinity | |
| 1 | 48.14201  A(1) | 170.44793 | 12.148479 | Zinc Selenide |
| | Aspheric coefficients<br>A(1)   a: -.157932E-06   b: 0.161850E-10<br>           c: -.627339E-13   d: 0.368070E-16 | | 2.890998 | |
| 2 | 80.83844 | 51.86696 | 7.813598 | Germanium |
| | | | 17.894076 | |
| 3 | -39.03276 | 919.67447 | 2.000000 | Barium Fluoride |
| | | | 37.678105 | |
| 4 | -33.53733 | -49.16283 A(2) | 3.978226 | Zinc Selenide |
| | Aspheric coefficients<br>A(2)   a: 0.468989E-05   b: 0.501231E-08<br>           c: -.956175E-11   d: 0.115736E-13 | | 44.658114 | |
| 5 | 7347.84946 | -153.20503 | 4.141460 | Germanium |
| | | | 46.908873 | |
| 6 | 98.65090 | 62704.77443 | 6.032416 | Zinc Selenide |
| | | | 3.094372 | |
| 7 | -17.67487 | -55.32265 | 2.000000 | Barium Fluoride |
| | | | 25.000000 | |
| 8 | 60.81930  A(3) | -80.97354 | 6.821186 | Zinc Selenide |
| | Aspheric coefficients<br>A(3)   a: -.384965E-05   b: -.112405E-07<br>           c: 0.110413E-09   d: -.344985E-12 | | 7.000099 | |
| Dewar Window | Infinity | Infinity | 1.0 | Germanium |
| | | | 4.400 | |
| Cold Stop | Infinity | | 29.54 | |
| Image Plane | Infinity | | | |

Figure 10

DUAL SPECTRAL-BAND OPTICAL LENS IMAGER

REFERENCE TO RELATED APPLICATIONS

This is a divisional patent application of application Ser. No. 12/975,424, filed Dec. 22, 2010, entitled "Dual Band Infrared Continuous Zoom Lens," now U.S. Pat. No. 8,724,216. The aforementioned application is hereby incorporated herein by reference.

GOVERNMENT INTEREST

The invention described herein may be manufactured, used, sold, imported, and/or licensed by or for the Government of the United States of America.

FIELD OF THE INVENTION

This invention relates in general to optics, and more particularly to dual-band infrared continuous zoom lens system.

BACKGROUND OF THE INVENTION

With the development of dual band focal plane arrays which image both the mid-wavelength infrared (MWIR) and long-wavelength infrared (LWIR) spectral bands simultaneously at the same image plane, the development of various types of optical systems has been required. In order to keep the same capabilities as a single band system (i.e., MWIR only), it is necessary to develop similar types of optical systems. One useful type of optical system is a continuous zoom lens arrangement which enables FOV changing from the lenses shortest focal length to its longest focal length, and every focal length in between with good optical performance. This has previously been accomplished in both the MWIR and LWIR spectral bands independently. However, a dual band system requires a more complex optical design because of the need to image both spectral bands at the same image plane even though this is not the natural tendency of the optics. These lenses require significant color correction for each focal length. This is very difficult for systems that require significant focal length changes.

Due to the reduced transmission from the broader spectral band, the fewer optical elements the better in order to reduce ghost images and improve system noise equivalent temperature difference (NETD).

SUMMARY OF THE INVENTION

An exemplary continuous-zoom dual-band optical lens imager is disclosed based on infrared optical materials. Such an exemplary continuous-zoom dual-band optical lens imager comprises six stationary lenses; two lenses axially movable; and a focal plane array, wherein said lenses are optically configured to transmit spectral wavelengths in the range of 3.5-11.0 microns to form a collocated image plane for MWIR and LWIR spectral bands.

In another aspect, an exemplary optical operating system is disclosed based on an optical lens system having an optical lens imager capable of a variable focal length configured with an exemplary reflective afocal of a like magnification. Said optical operating system comprises the steps of: light enters the optical lens system via the reflective afocal; said light is first reflected off of a primary mirror, wherein said primary mirror is a concave parabolic off-axis mirror; said first reflected light is second reflected from a secondary mirror, wherein said secondary mirror is a convex off-axis parabolic mirror; said second reflected light from said secondary mirror is passed to a fold mirror; said light from said fold mirror is then reflected from a tertiary mirror, wherein said tertiary mirror is an off-axis concave parabolic mirror, and wherein there is an intermediate image plane between the fold mirror and the tertiary mirror; and said light reflected from said tertiary mirror is reflected off another fold mirror to be passed to said optical lens imager of a configured field of view. Said another fold mirror is disposed between the optical lens imager and the reflective afocal to achieve a compact optical operating system.

Yet, in another aspect, an exemplary continuous-zoom dual spectral-band optical lens imager is disclosed based on infrared optical materials. Such an exemplary continuous-zoom dual spectral-band optical lens imager comprises a first lens based on zinc selenide and having an aspheric front surface; a second lens based on germanium and having spherical front and back curvatures; a third lens based on barium fluoride and having spherical front and back curvatures, wherein the first, second and third lenses form a triplet; a fourth lens based on zinc selenide and having a spherical first surface and aspheric second surface; a fifth lens based on germanium and having a spherical first surface and spherical second surface, wherein said fifth lens is moveably configured as a first zoom lens to moveably effect a focal length without changing an image plane location for either of the dual spectral bands; a six lens based on zinc selenide and having spherical first and second surfaces, wherein said sixth lens is moveably configured as a second zoom lens; a seventh lens based on barium fluoride and having spherical front and back surfaces; an eighth lens based on zinc selenide and having an aspheric first surface and a spherical second surface; and a dewar window based on an infrared transmitting material such as germanium; and a focal plane array. Said dewar window is configured to provide a vacuum seal to a dewar at cryogenic temperatures. Said focal plane array is either a dual band focal plane array or a broad band focal plane array housed in said dewar. An aperture stop or a cold stop is disposed between said dewar window and said focal plane array to determine a solid angle of the optics for each portion of said focal plane array. A pupil formed by the aperture stop is reimaged in-front of the first lens to form an entrance pupil for all fields of view.

BRIEF DESCRIPTION OF THE DRAWINGS

Additional advantages and features will become apparent as the subject invention becomes better understood by reference to the following detailed description when considered in conjunction with the accompanying drawings wherein:

FIG. 8a shows an exemplary optical path at the maximum system focal length of 445 mm based on an exemplary series of optical configurations demonstrating the continuous zoom method of the continuous zoom imager combined with the 3.42× afocal to create an overall zoom range of 11.7×.

FIG. 8b shows an exemplary optical path for the focal length at 300 mm among the exemplary optical configurations of the continuous zoom imager combined with the 3.42× afocal.

FIG. 8c shows exemplary imager zoom lenses moved in focal lengths and zoomed toward the focal length of 222.5 mm.

FIG. 8d shows an exemplary optical path passing through both the afocal and the imager in its widest field of view position to create an overall system focal length of 130 mm at f/3.0.

FIG. 10 shows an exemplary table of optical prescription of the dual band continuous zoom imager enabling the zoom range of 38-130 mm operating at f/3.0 with a common focus for both the MWIR and LWIR.

DETAILED DESCRIPTION

Figure 1:
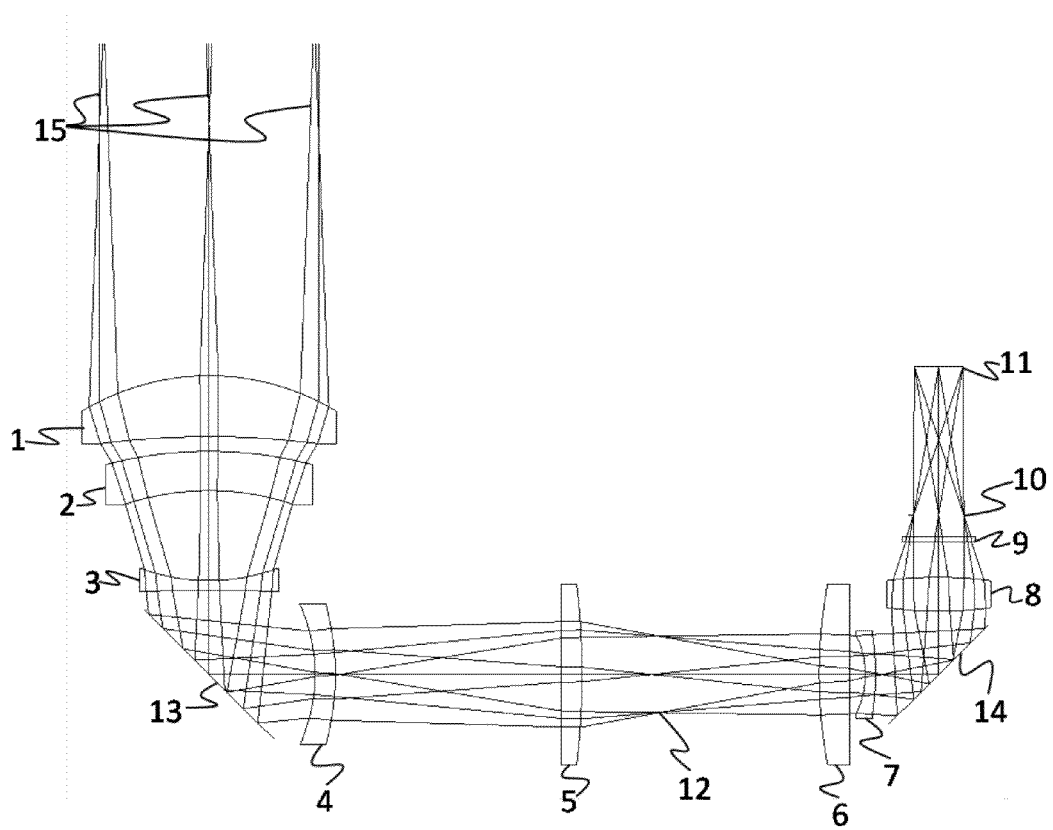
FIG. 1 shows an exemplary optical layout of a 3.42× continuous zoom dual band MWIR and LWIR lens imager based on various infrared optical materials.

An exemplary optical system as shown in FIG. 1 comprises eight infrared imaging lenses that all transmit over the wavelengths 3.5-11.0 microns and form a collocated image plane for the MWIR (3.5-5.0 microns) and LWIR (7.5-11.0 microns) spectral bands. The lens arrangement can have six stationary lenses, and two lenses that move in an axial fashion. The lens arrangement is configured as an imager to utilize a cold stop inside the dewar to act as the aperture stop of the system and control the stray light from reaching the FPA, as is typically configured in a cooled infrared system. The pupil is reimaged from the cold stop to near the first lens of the system to minimize the size of the lens. The optic is designed to operate at an f/number of 3.0 and provides a focal length range from 38 mm to 130 mm for a 640×480 element focal plane array with 20 micron square pixels. This has an equivalent image plane diameter of 16 mm, and results in a horizontal field of view range of 5.6-19.1 degrees. This optical system is designed to work with a cold shield height of 29.46 mm, although this value could be varied with slight tweaks to the optical design. The range in focal length result in an overall zoom change of 3.42×.

Such an exemplary imager can be combined with a reflective afocal of magnification 3.42× to achieve a continuous zoom range of 11.6×. The additional zoom range can be achieved by using an afocal that utilizes a bypass mirror to maintain the imager focal lengths and then combine with the 3.42× afocal to create focal lengths from 130-445 mm. The entrance pupil of the imager is thus also sized to be 3.42× the size of that of the imager by itself. The size of the entrance pupil can be minimized via the use of dual f/number capability where the f/number changes to minimize the maximum aperture. In this case the f/number will change by a factor of two at the point where the system focal length is half that of the maximum focal length of the system. The maximum aperture is thus scaled in half.

The optical materials of each lens shown in FIG. 1 can be chosen to not only transmit the required MWIR and LWIR spectral bands, but to aid in providing color correction for each spectral band so that the image planes will fall in the same location as well provide the same focal length to within a small tolerance. The ray trace for such an exemplary optical system is shown in FIG. 1. The first three lenses form a triplet prior to the zoom lenses. The first lens 1 can be a Zinc Selenide element with an aspheric front surface. This lens is followed by a Germanium lens 2 and a Barium Fluoride lens 3, both of which have spherical front and back curvatures. The fourth lens 4 is a zinc selenide lens with a spherical first surface and aspheric second surface. The fifth lens 5 is the first of two zoom lenses that move in the same direction to create the change in focal length without changing the image plane location for either spectral band. This lens is made from germanium and has a spherical first surface and spherical second surface. The second zoom lens 6 is made from Zinc Selenide and has both spherical first and second surfaces. The total travel for the first zoom lens 5 is 43.0 mm and the second zoom lens 6 is 69.9 mm. The last two lenses are comprised of barium fluoride 7, and zinc Selenide 8, respectively. The barium fluoride lens 7 has spherical front and back surfaces. The last lens 8 has an aspheric first surface and a spherical second surface. The lens is followed by a dewar window 9 comprised on an infrared transmitting material such as germanium. This window is used to provide a vacuum seal to the dewar that houses the dual band or broad band focal plane array 11 and maintain it at cryogenic temperatures. Between the window and focal plane array, at an optical distance of 29.46 mm is an aperture stop 10 that is maintained at cryogenic temperatures and referred to as a cold stop. This aperture is the aperture stop of the system and determines the solid angle of the optics for each portion of the focal plane array. The pupil formed by the aperture stop is reimaged in-front of the first lens 1 to form an entrance pupil for all field of view. The reimaging requires that an intermediate image plane 12 be formed within the lens. This image plane 12 falls between the two zoom lenses (5,6) for the majority of zoom positions, but both lenses fall on the object side of the intermediate image plane for the widest field of view zoom position. There are two locations for fold mirrors (13,14) which enable the system to be folded in multiple ways for package purposes if desired. These fold mirrors are optional and any subset number of mirrors (0,1, or 2) can be used depending on the desired packaging. The mirrors can also be folded in any 45 degree orientation. The optical rays 15 trace through all of the described lenses and form images at the location of the focal plane array 11. Both the MWIR and the LWIR form its image plane at this location for all fields of view.

Figure 2:
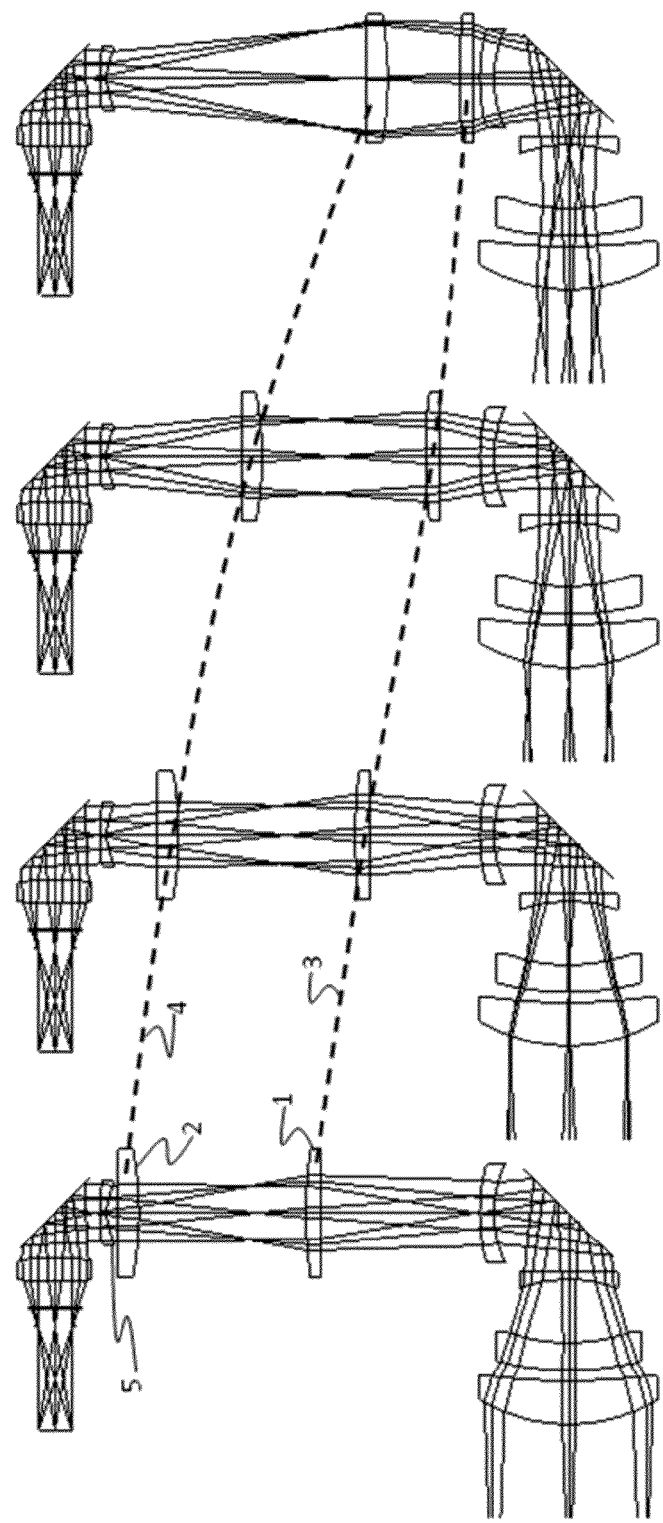
FIG. 2 shows various exemplary optical layout based on motion of zoom lenses to change the focal length of the 3.42× continuous zoom dual band MWIR and LWIR lens.
Figure 3:
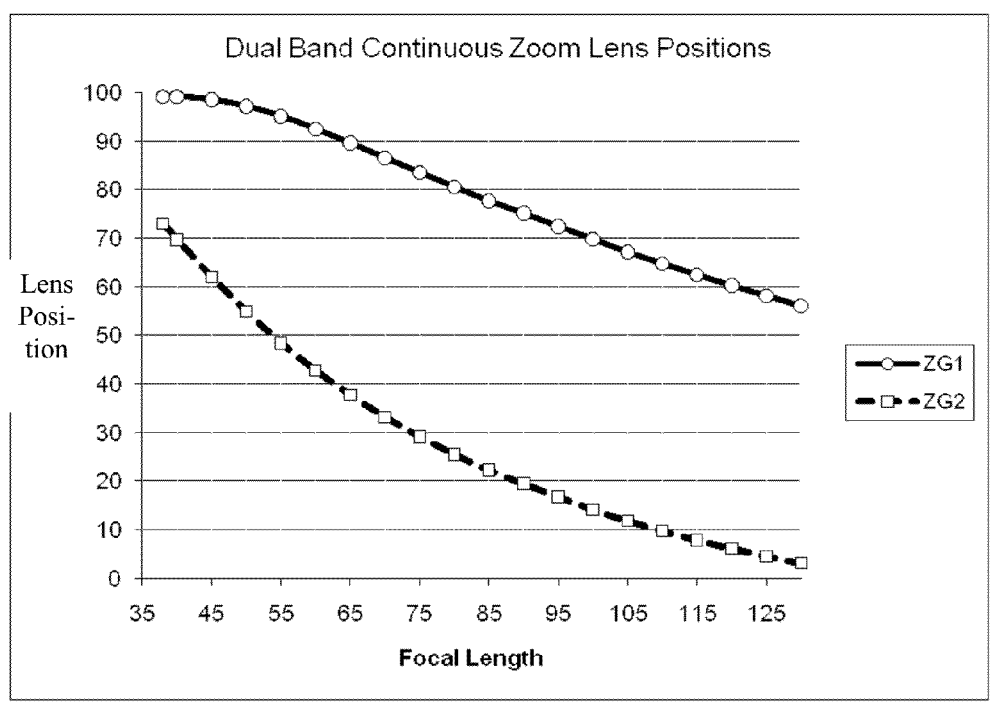
FIG. 3 shows an exemplary graphical representation of motion of zoom group 1 (ZG1) and zoom group 2 (ZG2) for continuous zoom dual MWIR and LWIR lens.

FIG. 2 demonstrates the path that each zoom lens follows through the various zoom positions. In order to change the focal length from the shorter focal length to the longer focal length, the zoom lenses (1,2) move independently away from the image plane and towards the first lens in a smooth continuous motion. Each lens moves independently and at a different rate. The prescribed motion is continuous in nature and can be described by this set of curved lines (3,4) as shown in FIG. 2 and FIG. 3. The second zoom lens passes through the intermediate image plane to achieve the shortest focal lengths. The range of focal lengths for which this occurs are 40-48 mm and result in slightly degraded, albeit acceptable performance. The lens for all other FOV position results in a well corrected, near diffraction limited image for each individual spectral band, MWIR and LWIR. In each case the MTF is well above a reasonable value at the Nyquist limit of the detector at 25 lp/mm for both spectral bands evaluated at the same image plane location. The optical prescription for such an exemplary optical system is located in the exemplary table of FIG. 10. The air gaps between lens 4 and lens 5, between lens 5 and lens 6, and between lens 6 and lens 7 adjust to perform the overall zoom capability. The overall length of the lens remains the same in this process. The curve ZG1 from FIG. 3 represents the motion of the first zoom lens 1 as shown in FIG. 2. This curve ZG1 in FIG. 3 is based on the curve 3 that is drawn in FIG. 2. The lens position from FIG. 3 corresponds to the distance from this lens 1 to the next non-moving element as represented by lens number 7, which is lens 5 in FIG. 2. At the widest FOV position, the 1st zoom lens 1 is furthest away from this non-moving lens 5. Likewise, the curve for ZG2 in FIG. 3 is based on the motion of the 2nd zoom lens 2 of FIG. 2. The motion of this lens is relative to the next non-moving element 5 as seen in FIG. 2. The distance between the two curves (ZG1, ZG2 of FIG. 3) represents the distance between the two zoom lenses (1, 2 of FIG. 2) for any given focal length.

This lens can also be used as a multiple FOV lens where the FOV is changed by an axial zoom and only image at discrete positions along the axis. Any number of zoom positions could be used from a fixed focal length lens, two-position, to an infinite number of positions.

The re-imaged pupil of the lens is located at a distance of 60 mm in front of the first lens. This enables the lens to be combined with an afocal to change the focal length range of the continuous zoom lens. This change can either be used to create a fixed change in focal length range, or be combined with a switchable afocal to extend the overall zoom range of the system.

The range of continuous zoom with dual band capability can be increased by the addition of an afocal of the same magnification change as the imager. Such an optical system is shown in, e.g., FIG. 4. The system comprises of the imager as previously described combined with a reflective afocal, e.g., of the same magnification. To obtain a continuous zoom, such an exemplary 3.42× zoom range imager is combined with an exemplary 3.42× magnification afocal. The new resulting exemplary lens system is described in FIGS. 4-8 where each figure comprises of the same set of lenses and mirrors, but the position of some of the lenses and mirror are moved relative to each other in order to change the focal length of the system. The continuous movement of the imager lenses allow for a continuous zoom, and the discrete motion of the afocal fold mirror to bypass the afocal optical path provides for either a larger discrete jump in magnification, or enables the continuation of the of the zoom range from 3.42× to 11.7×. The discrete jump in magnification occurs if the imager is not reset to its shortest focal length when the bypass mirror is removed from the optical path. The reflective nature of the afocal enables the increase in the zoom range with no bearing on the chromatic properties of the dual band lens, thus maintaining the dual band zoom capability.

Figure 4:
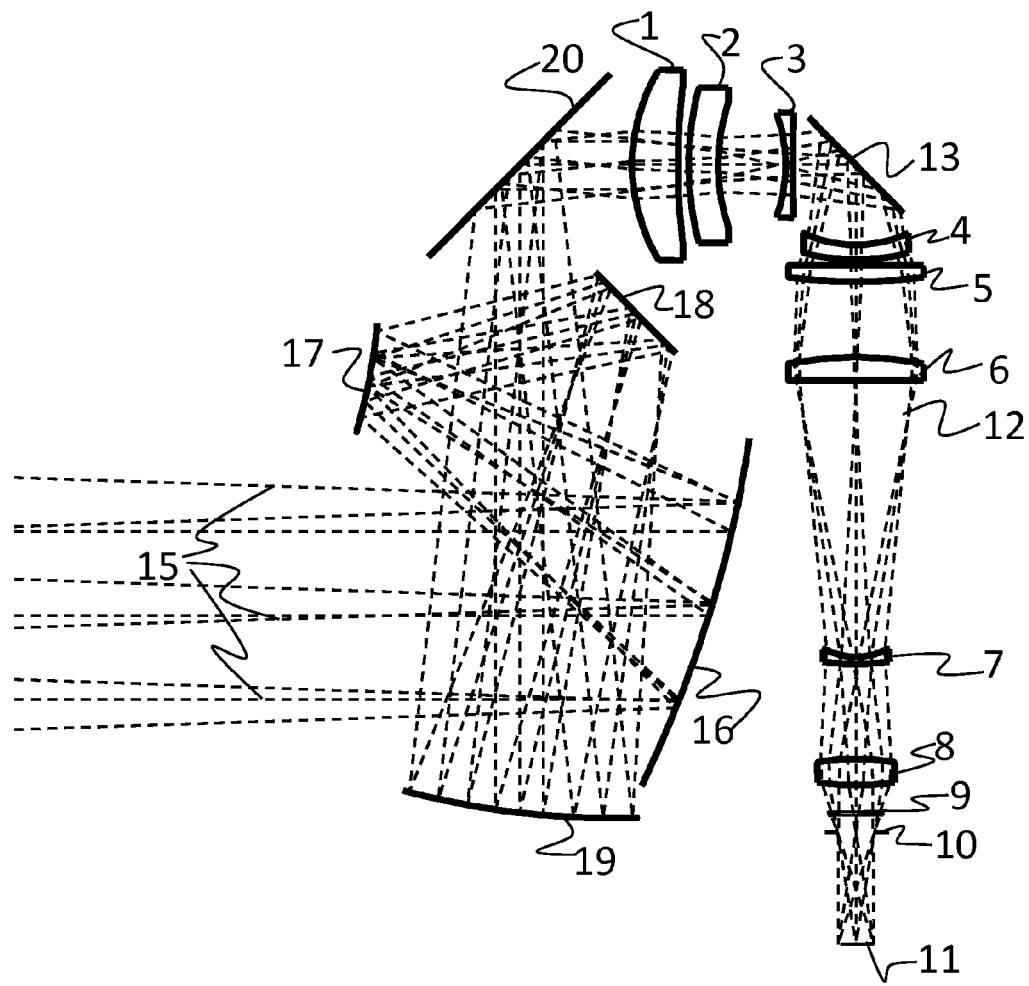
FIG. 4 shows an exemplary optical layout of 3.42× continuous zoom dual band MWIR and LWIR lens imager combined with 3.42× reflective afocal, with imager in widest field of view position at fast f/number.

FIG. 4 shows the ray trace of an exemplary imager combined with the 3.42× afocal when the imager is in its shortest focal length position. The 38 mm focal length of the imager is multiplied by the 3.42× magnification of the afocal to create a system focal length of 130 mm. This is achieved with the system at an f/number of 3.0. The imager entrance pupil for this imager FOV position is close enough to the optimal position for the afocal such that the extent of the traced rays 15 will not fall off of the mirror surfaces. The light enters the optical system via the afocal and is first reflected off of the primary mirror 16. This mirror is a concave parabolic off-axis mirror. The light is reflected onto the secondary mirror 17 which is a convex off-axis parabolic mirror. This light is passed to a fold mirror 18 and then onto the tertiary mirror 19 which is also an off-axis concave parabolic mirror. There is an intermediate image plane between the fold mirror 18 and the tertiary mirror 19. This re-imaging capability is necessary to also re-image the pupil that is designed near the primary mirror to form an exit pupil outside of the afocal that is co-aligned with the entrance pupil of the imager that is combined with the afocal. There is another fold mirror 20 that lies between the imager and afocal and is used to form a more compact package. The light then passes into the imager that is configured at its widest field of view position.

Figure 5:
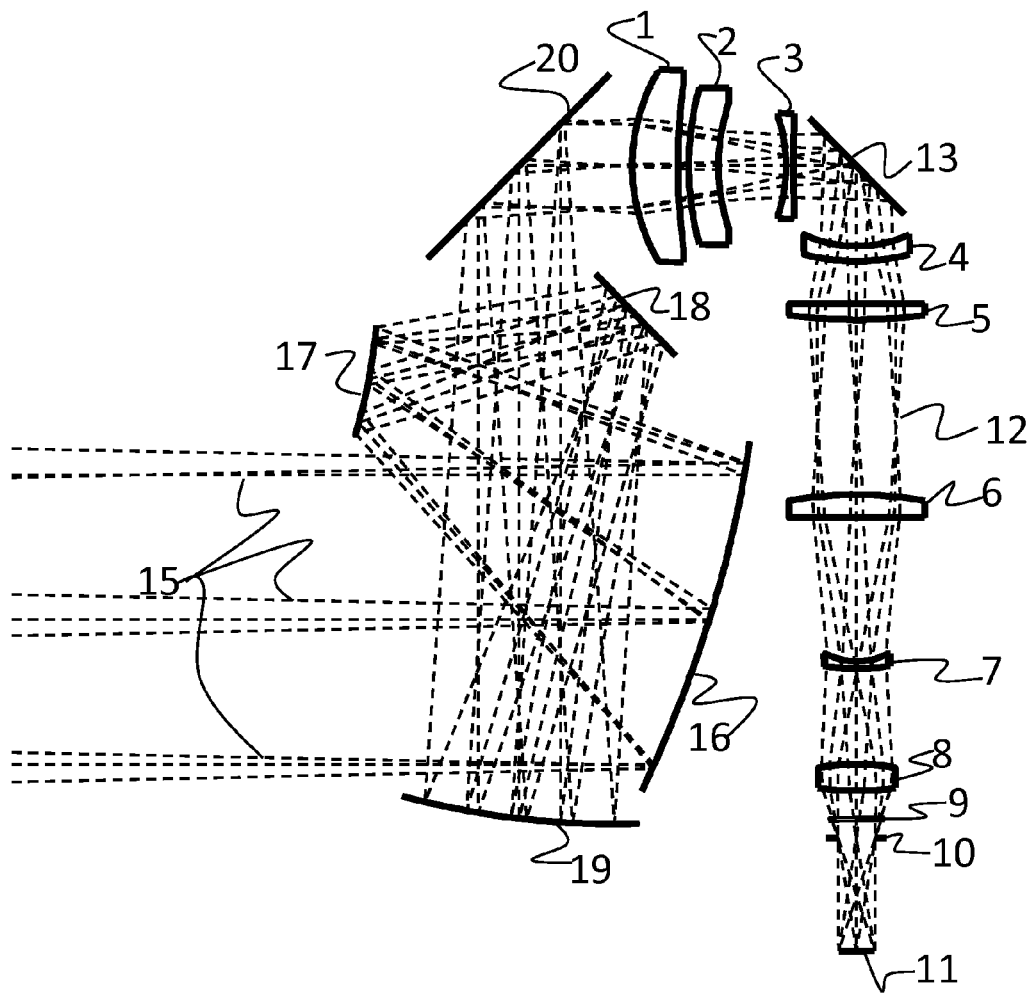
FIG. 5 shows an exemplary optical layout of 3.42× continuous zoom dual band MWIR and LWIR lens imager combined with 3.42× reflective afocal, with imager in field of view position that creates half of the maximum focal length when combined with the 3.42× afocal thus maximizing the system aperture when operating at f/3.0.
Figure 6:
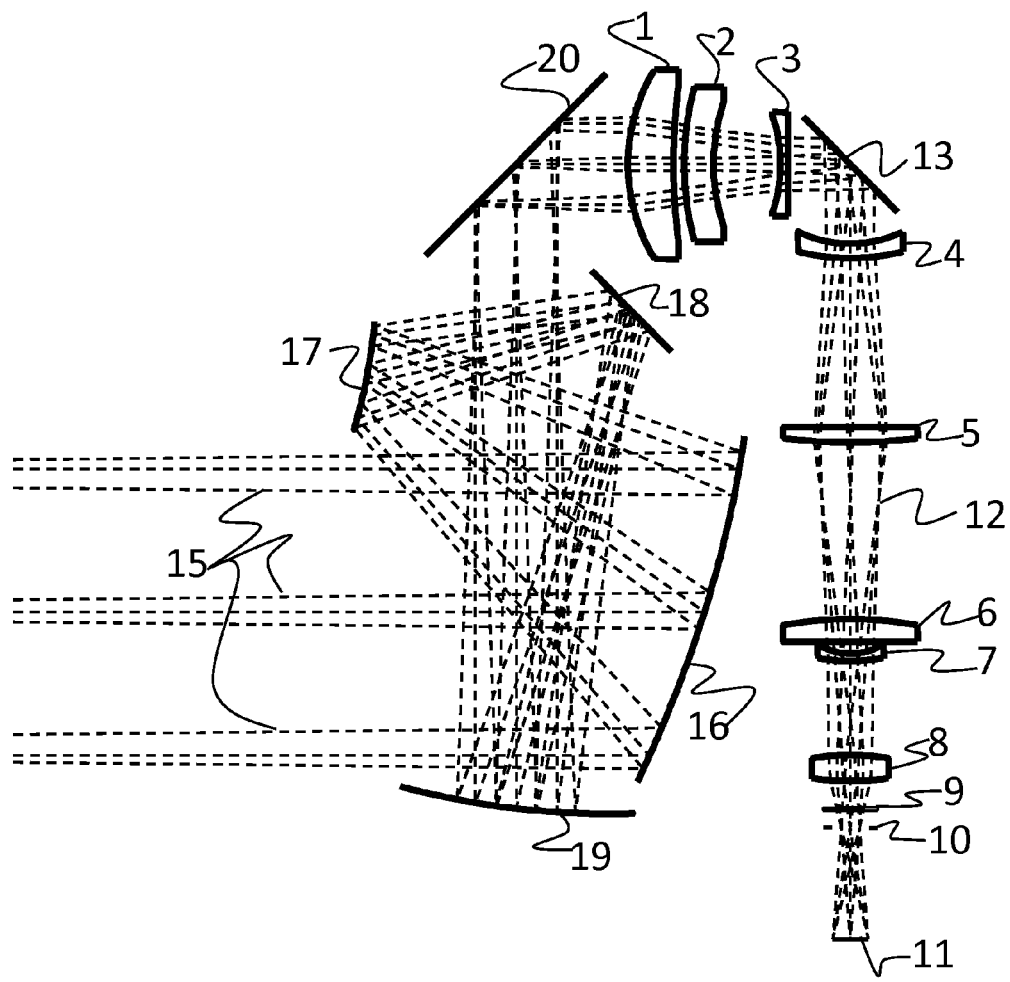
FIG. 6 shows an exemplary optical layout of 3.42× continuous zoom dual band MWIR and LWIR lens imager combined with 3.42× reflective afocal, with imager in field of view position that creates the maximum system focal length when combined with the 3.42× afocal.

FIG. 5 shows the same afocal/imager setup but with the zoom lenses (5,6) moved to a position to create a longer focal length. In this configuration, the focal length of the imager is 65 mm and the combined focal length is 222.5 mm. This focal length position is of interest because it is the point where the imager and afocal combined with the imager operating at f/3.0, fills up the entire aperture of the afocal. In order to continue the zoom to longer focal lengths, it is necessary to change the f/number via changing the diameter of the aperture stop located within the dewar otherwise known as the cold stop 10. This focal length is exactly one half of the maximum focal length of the system. By changing the f/number for all focal lengths greater than the 222.5 m focal length enables a longer focal length to be utilized for a given maximum system aperture size, while maintaining the faster f/number for all other focal lengths to maximize light collection capability. In this case, the f/number is scaled by a factor of two for all focal lengths greater than 222.5 mm from a value of 3.0 to 6.0. The maximum aperture diameter will then not be violated up to the point where the focal length reaches 445.0 mm, at f/6.0. FIG. 6 shows the afocal/imager combination where the maximum focal length of 445 mm is achieved. This entrance pupil diameter is the same as the entrance pupil for the 222.5 mm lens configuration because the aperture stop 10 is resized for an f/6.0, and then reimaged to near the primary mirror 16, minimizing its overall diameter. This configuration consists of the imager operating at a focal length of 130 mm as achieved by the movement of the two zoom lenses (5.6).

Figure 7:
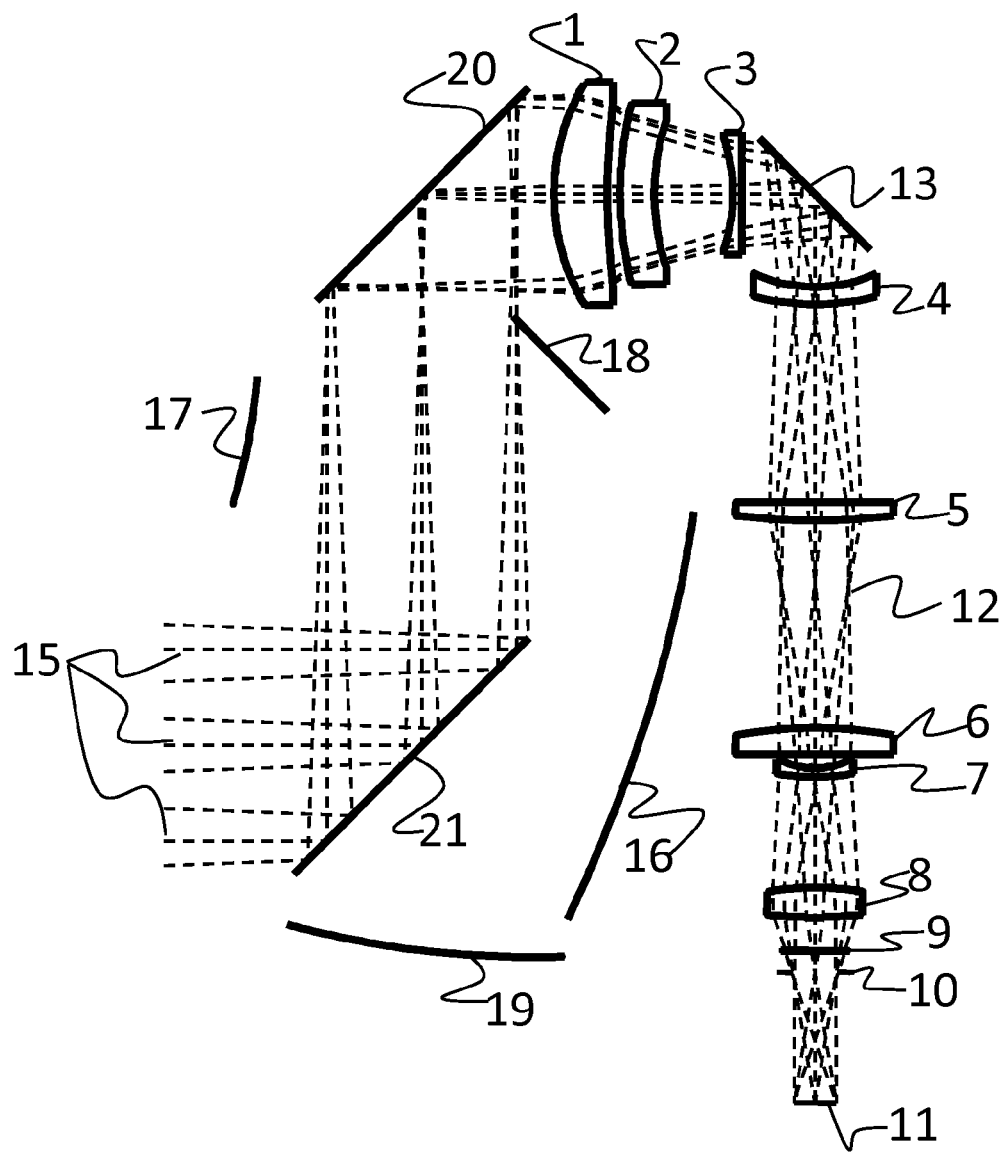
FIG. 7 shows an exemplary optical layout of 3.42× continuous zoom dual band MWIR and LWIR lens imager with 3.42× reflective afocal bypass mirror in position and imager at its longest focal length and at the fastest f/number of the system.
Figure 8E:
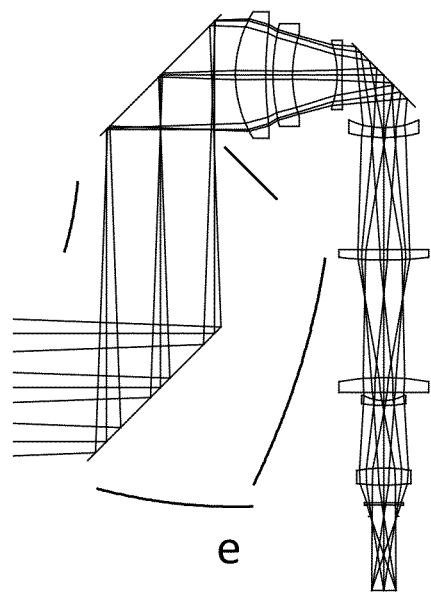
FIG. 8e shows an exemplary imager configuration at its longest focal length of 130 mm while operating at f/3.0 with the afocal bypass mirror in place.
Figure 8F:
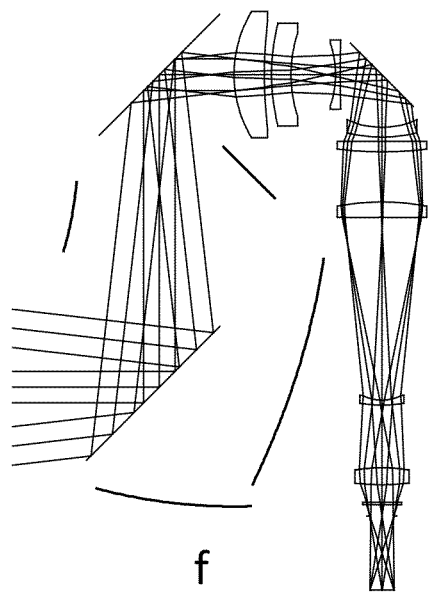
FIG. 8f shows the widest field of view of an exemplary imager configuration in its shortest focal length position, the afocal bypass mirrors being used to form an overall focal length of 38 mm at f/3.0.
Figure 9:
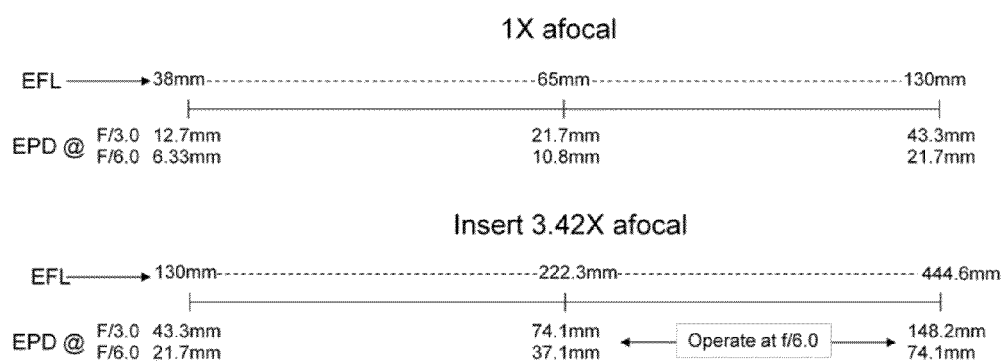
FIG. 9 shows an exemplary diagram of the change in focal lengths, f/numbers, and entrance pupil diameters for the continuous zoom dual band dual f/number catadioptric optical system.

The shorter focal positions, where the focal length is 130.0 mm and less are achieved by merely the use of the imager and a bypass mirror 21, as shown in FIG. 7, which keeps the light from entering the magnified afocal and directs the light onto the imager. Alternatively, instead of a bypass mirror, the fold mirror 20 between the afocal and imager could by flipped in and out of the field of view to enable the imager to operate without passing through the magnified afocal. FIG. 7 shows one configuration of this circumstance where the imager at a focal length of 130 mm and f/3.0 utilizes the bypass mirror to pass light through only the imager. Thus, the dual band continuous zoom imager with zoom range of 3.42× is allowed to image between the focal lengths of 38-130 mm. FIGS. 8*a*-8*f* show an exemplary series of all of these positions as stepped through the full zoom range of the system to provide an overall magnification change of 11.7×. If examined from widest field of view to narrowest, the fields of view changes from FIG. 8*f* to FIG. 8*a*. In FIG. 8*f*, the widest field of view is observed as the imager is in its shortest focal length position and the afocal bypass mirrors are used to form an overall focal length of 38 mm at f/3.0. FIG. 8*e* shows the next significant position where the imager is at its longest focal length of 130 mm while operating at f/3.0 with the afocal bypass mirror in place. All of the focal length positions between these two values are achieved as previously discussed. To continue the zoom, the afocal bypass mirror is moved out of the way and the imager zoom lenses are moved back to the original position of where they achieved the 38 mm focal length. The optical path now passes through both the afocal and the imager in its widest field of view position to create an overall system focal length of 130 mm at f/3.0 as seen in FIG. 8*d*. The imager zoom lenses are then moved to longer focal lengths and zoomed up to the point where the focal length equals 222.5 mm as shown in FIG. 8*c*. At this point, in order to continue zooming to longer focal lengths, it is necessary to change the aperture stop diameter to maintain the entrance pupil smaller than 74.1 mm. The f/number is scaled by a factor of two by changing the diameter of the aperture by the same amount. The f/number thus changes to 6 and the diameter of the aperture is cut in half. The lens can then continue to zoom from 222.5 mm to 445 mm without violation of the maximum aperture constraint. FIG. 8*b* shows the optical path with the focal length at 300 mm and FIG. 8*a* shows the optical path at the maximum system focal length of 445 mm. Both of these are at an f/number value of 6. The entrance pupil diameter of this narrowest field of view matches that of the entrance pupil diameter at half its field of view. The diagram in FIG. 9 shows the various focal lengths, f/numbers, and aperture values for each corresponding focal length position. Any position where the aperture is smaller than 74.1 mm at f/3 is operated at f/3.0. All other positions operate at f/6.0. Other f/number combinations are feasible. It is also not necessary to change the f/number at all if a larger aperture is acceptable, but the dual f/number approach enables the maximization of focal length versus minimization of aperture size.

It is obvious that many modifications and variations of the present invention are possible in light of the above teachings. It is therefore to be understood that within the scope of the appended claims, the invention may be practiced otherwise than as described.

What is claimed is:

1. A continuous-zoom dual spectral-band optical lens imager based on infrared optical materials, comprising:
    a first lens based on zinc selenide and having an aspheric first surface;
    a second lens based on germanium and having spherical first and second surfaces;
    a third lens based on barium fluoride and having spherical first and second surfaces, wherein the first, second and third lenses form a triplet;
    a fourth lens based on zinc selenide and having a spherical first surface and
    aspheric second surface;
    a fifth lens based on germanium and having a spherical first surface and spherical second surface, wherein said fifth lens is movably configured as a first zoom lens to moveably effect a focal length without changing an image plane location for either of the dual spectral bands;
    a sixth lens based on zinc selenide and having spherical first and second surfaces, wherein said sixth lens is moveably configured as a second zoom lens;
    a seventh lens based on barium fluoride and having spherical first and second surfaces;
    an eighth lens based on zinc selenide and having an aspheric first surface and a spherical second surface;
    a dewar window based on an infrared transmitting material, wherein said dewar window is configured to provide a vacuum seal to a dewar at cryogenic temperatures; and
    a focal plane array, wherein said focal plane array is either a dual band focal plane array or a broad band focal plane array housed in said dewar, wherein an aperture stop or a cold stop is disposed between said dewar window and said focal plane array, and wherein a pupil formed by the stop is reimaged in-front of the first lens to form an entrance pupil for all fields of view.

2. The continuous-zoom dual spectral-band optical lens imager according to claim 1, comprising at least one of a first fold mirror disposed between said third lens and said fourth lens; and a second fold mirror disposed between said seventh lens and said eighth lens, wherein at least one of said first fold mirror and second fold mirror is disposed in a 45-degree configuration to achieve a compact folded arrangement of the optical lens imager, wherein optical rays can trace through said lenses and form a mid-wavelength infrared image and a long-wavelength infrared image on an image plane of said focal plane array.

3. The continuous-zoom dual spectral-band optical lens imager according to claim 1, wherein a total travel for the first zoom lens is about 43.0 mm, and a total travel for the second zoom lens is about 69.9 mm.

4. The continuous-zoom dual spectral-band optical lens imager according to claim 1, wherein the first and second zoom lenses are capable of independently moving to various positions to change the focal length, wherein the second zoom lens is capable of passing through an intermediate image plane to achieve short focal lengths.

* * * * *